(12) United States Patent
Hsu

(10) Patent No.: US 11,280,369 B2
(45) Date of Patent: Mar. 22, 2022

(54) UNIFORM DISTRIBUTION SUPPORT STRUCTURE OF ROTARY SHAFT LINK ASSEMBLY

(71) Applicant: FIRST DOME CORPORATION, New Taipei (TW)

(72) Inventor: An Szu Hsu, New Taipei (TW)

(73) Assignee: First Dome Corporation, New Taipei (TW)

( * ) Notice: Subject to any disclaimer, the term of this patent is extended or adjusted under 35 U.S.C. 154(b) by 0 days.

(21) Appl. No.: 16/855,251

(22) Filed: Apr. 22, 2020

(65) Prior Publication Data

US 2021/0222729 A1 Jul. 22, 2021

(30) Foreign Application Priority Data

Jan. 22, 2020 (TW) ................................ 109102555

(51) Int. Cl.
| | |
|---|---|
| *E05D 1/00* | (2006.01) |
| *F16C 11/12* | (2006.01) |
| *E05D 3/12* | (2006.01) |
| *E05D 7/00* | (2006.01) |
| *G06F 1/16* | (2006.01) |

(52) U.S. Cl.
CPC ............... *F16C 11/12* (2013.01); *E05D 1/00* (2013.01); *E05D 3/122* (2013.01); *E05D 7/00* (2013.01); *E05Y 2800/205* (2013.01); *E05Y 2800/242* (2013.01); *E05Y 2900/606* (2013.01); *G06F 1/1681* (2013.01)

(58) Field of Classification Search
CPC ...... G06F 1/168; G06F 1/1681; G06F 1/1616; G06F 1/547; E05Y 2900/602; E05Y 2900/606; E05Y 2800/205; E05Y 2800/20; E05Y 2800/242; H04M 1/022; H04M 1/0214; H04M 1/0216; E05D 3/12; E05D 3/122; E05D 3/14; E05D 3/16; E05D 3/06; E05D 11/06; E05D 1/00; E05D 1/02; E05D 1/04; E05D 7/00; F16C 11/12

See application file for complete search history.

(56) References Cited

U.S. PATENT DOCUMENTS

| | | | |
|---|---|---|---|
| 8,854,834 B2 * | 10/2014 | O'Connor | G06F 1/1641 361/807 |
| 9,268,372 B1 * | 2/2016 | Hsu | G06F 1/1681 |
| 9,748,720 B2 * | 8/2017 | Huang | H01R 39/64 |

(Continued)

*Primary Examiner* — Chuck Y Mah
(74) *Attorney, Agent, or Firm* — Rosenberg, Klein & Lee

(57) ABSTRACT

A uniform distribution support structure of rotary shaft link assembly includes a rotary shaft assembly and a support assembly. The rotary shaft assembly has multiple connection members. Each connection member is formed with a hollow section and a perforation. A guide face is disposed in each hollow section. A spacer shaft rod is disposed between each two adjacent connection members. Each spacer shaft rod is formed with a through hole. A guide arched face is disposed in each through hole. The support assembly has a support member and a lateral support member passing through the through holes and the hollow sections. Multiple opposite guide arched faces are disposed on the support member. Multiple opposite guide faces are disposed on the lateral support member. The guide faces and the guide arched faces respectively abut against the opposite guide faces and the opposite guide arched faces.

19 Claims, 11 Drawing Sheets

(56) References Cited

U.S. PATENT DOCUMENTS

| | | | |
|---|---|---|---|
| 2007/0117600 A1* | 5/2007 | Robertson, Jr. | G06F 1/1616 455/575.3 |
| 2011/0097138 A1* | 4/2011 | Eikelenboom | E05D 15/26 403/81 |
| 2012/0137471 A1* | 6/2012 | Kujala | G06F 1/1681 16/382 |
| 2014/0126133 A1* | 5/2014 | Griffin | G06F 1/1652 361/679.27 |
| 2014/0174226 A1* | 6/2014 | Hsu | G06F 1/1681 74/98 |
| 2014/0196254 A1* | 7/2014 | Song | E05D 3/14 16/302 |
| 2014/0217875 A1* | 8/2014 | Park | G06F 1/1681 312/326 |
| 2015/0040353 A1* | 2/2015 | Chen | G06F 1/1681 16/366 |
| 2015/0131222 A1* | 5/2015 | Kauhaniemi | G06F 1/1681 361/679.27 |
| 2015/0176317 A1* | 6/2015 | Lee | E05D 3/06 16/251 |
| 2015/0277505 A1* | 10/2015 | Lim | G06F 1/1681 361/679.27 |
| 2015/0277506 A1* | 10/2015 | Cheah | G06F 1/1616 361/679.27 |
| 2015/0361696 A1* | 12/2015 | Tazbaz | E05D 7/00 361/679.27 |
| 2016/0132075 A1* | 5/2016 | Tazbaz | G06F 1/1681 361/679.27 |
| 2016/0224072 A1* | 8/2016 | Huang | G06F 1/1616 |
| 2016/0370828 A1* | 12/2016 | Hsu | G06F 1/1681 |
| 2017/0061836 A1* | 3/2017 | Kim | G06F 1/1652 |
| 2018/0292863 A1* | 10/2018 | Escamilla | E05D 11/00 |
| 2019/0274227 A1* | 9/2019 | Hsu | G06F 1/1652 |
| 2020/0301480 A1* | 9/2020 | Miller | G06F 1/1681 |

\* cited by examiner

UNIFORM DISTRIBUTION SUPPORT STRUCTURE OF ROTARY SHAFT LINK ASSEMBLY

BACKGROUND OF THE INVENTION

1. Field of the Invention

The present invention relates generally to a uniform distribution support structure of rotary shaft link assembly, and more particularly to a support structure assembled in the rotary shaft assembly. When the support structure is forcedly bent, the connection members of the rotary shaft assembly are driven to pivotally rotate and displace and supported and arranged at fixed intervals.

2. Description of the Related Art

There are various electronic devices provided with upper covers or display screens, (such as mobile phones, notebooks, PDA and electronic books). The upper covers or display screens are pivotally assembled on the electronic devices via pivot pins or rotary shafts, whereby the upper covers or the display screens can be reciprocally rotated and opened/closed under external force. For example, Taiwanese Patent No. 97222022 "rotary shaft structure" and Taiwanese Patent No. 98207366 "pivot pin structure" provide typical embodiments.

In order to use the rotatable section (such as the screen) of the electronic device in more operation modes to widen the application range thereof, a conventional dual-shaft mechanism disposed between two pivoted modules has been developed, whereby the two modules can be rotated by different angles in accordance with different operation modes. For example, Taiwanese Patent No. 99211350 "dual-shaft hinge device", Taiwanese Patent No. 99225737 "biaxial hinge device" and U.S. Pat. No. 7,512,426 B2 "mobile communications device with synchronizing hinge" provide preferred embodiments.

In the above conventional pivot shaft structure, in consideration of the strength of the supporting structure and the smoothness of the operation, generally two sets of rotary shafts are respectively disposed on two sides of the pivoted sections of the ends/edges of the display module and the apparatus body module of an electronic apparatus (such as a notebook). Therefore, when operating and turning open the display module or the apparatus body module, the coordination between the rotary shafts is not idealistic. Also, the rotational freeness of the pivot shaft units disposed near the same central line is limited. As a result, in both the opening and closing rotation process of the entire electronic apparatus, the smoothness of operation is poorer.

In order to improve the above shortcoming, a conventional technique provides a pivot shaft device employing multiple rotational centers. For example, Taiwanese Patent No. 101224879 "multi-segment rotary shaft structure" and Taiwanese Patent No. 101224880 "plug-type multi-segment rotary shaft structure" provide substantial embodiments. The above references employ active joint assembly and driven joint assembly assembled with each other. A middle link plate assembly is disposed between the two opposite joint plates of the active joint assembly. In addition, the two opposite joint plates are provided with synchronous driving section connected with the middle link plate assembly. The driven joint assembly has two driven plates disposed between the two opposite joint plates of the active joint assembly. A shaft pin is assembled with the inner ends of the opposite joint plates corresponding to the outer ends of the driven plates. A shaft pin is assembled with the outer end of the middle link plate assembly corresponding to the inner ends of the driven plates. Accordingly, multiple active joint assemblies and driven joint assemblies are side-by-side arranged to together form a multi-segment rotary shaft structure.

However, in all the above conventional rotary shaft structures, most of the respective components are connected with each other by means of complicated structures. Moreover, there is no locating/holding mechanism for the respective components. As a result, the pivotally connected sections often loosen and swing and can hardly smoothly rotate.

It is therefore tried by the applicant to provide a uniform distribution support structure of rotary shaft link assembly to solve the problems existing in the conventional pivot shaft structures.

SUMMARY OF THE INVENTION

It is therefore a primary object of the present invention to provide a uniform distribution support structure of rotary shaft link assembly includes a rotary shaft assembly and at least one support assembly. The rotary shaft assembly at least has multiple side-by-side arranged connection members. Each connection member is formed with at least one hollow section. The top side and the bottom side of at least one lateral side in each hollow section are respectively formed with two protruding restriction sections. The opposite sides of the two restriction sections are respectively formed with two guide faces, (which can be raised arched faces). The support assembly has a flexible lateral support member. The lateral support member is passed between the two restriction sections in each hollow section. Multiple second seat sections are disposed on the lateral support member respectively corresponding to the connection members. The top side and bottom side of each second seat section are respectively formed with two opposite guide faces, (which can be recessed arched faces) to respectively abut against the guide faces and locate. When the lateral support member is forcedly bent, the connection members are driven to transversely serially connect with each other to pivotally rotate and displace and supported and arranged at fixed intervals.

It is a further object of the present invention to provide the above uniform distribution support structure of rotary shaft link assembly, in which rotary shaft assembly has multiple spacer shaft rods respectively disposed between the connection members. Each spacer shaft rod is formed with at least one through hole respectively corresponding to the perforations. The top side and the bottom side of each through hole are respectively formed with two corresponding guide arched faces, (which can be raised arched faces). The support assembly has a flexible support member. The support member passes through the through holes. Multiple first seat sections are disposed on the support member respectively corresponding to the through holes. The top side and bottom side of each first seat section are respectively formed with two opposite guide arched faces, (which can be recessed arched faces) corresponding to the guide arched faces. The guide arched faces respectively abut against the opposite guide arched faces and locate. When the support member is forcedly bent, the spacer shaft rods between the connection members are driven to pivotally rotate and displace and supported and arranged at fixed intervals.

To achieve the above and other objects, the uniform distribution support structure of rotary shaft link assembly of the present invention includes: a rotary shaft assembly at least having multiple connection members, the connection members being side-by-side arranged, each connection member being correspondingly formed with at least one hollow section, at least one guide face being disposed in the hollow section; and a support assembly at least having a flexible lateral support member passing through the respective hollow sections, multiple opposite guide faces being disposed on the lateral support member corresponding to the guide faces, the guide faces respectively abutting against the opposite guide faces to locate, whereby when the connection members rotate and displace, the connection members are stably supported and arranged at fixed intervals.

In the above uniform distribution support structure of rotary shaft link assembly, each connection member is formed with at least one perforation. The rotary shaft assembly has multiple spacer shaft rods respectively disposed between the connection members. Each spacer shaft rod is formed with at least one through hole respectively corresponding to the perforations. At least one guide arched face is disposed in each through hole. The support assembly has a support member. The support member passes through the perforations and the through holes. Multiple opposite guide arched faces are disposed on the support member corresponding to the guide arched faces. The guide arched faces respectively abut against the opposite guide arched faces to locate, whereby the spacer shaft rods between the connection members are supported and arranged at fixed intervals to stably and smoothly rotate.

In the above uniform distribution support structure of rotary shaft link assembly, multiple outward protruding second seat sections are disposed on the lateral support member. A flexible second connection section is disposed between each two adjacent second seat sections. The guide faces are respectively disposed on the second seat sections. Multiple outward protruding first seat sections are disposed on the support member. A flexible second connection section is disposed between each two adjacent first seat sections. The guide arched faces are respectively disposed on the first seat sections.

In the above uniform distribution support structure of rotary shaft link assembly, a first passage is transversely formed through each first seat section and a second passage is transversely formed through each second seat section. The pivot shafts of the pivot shaft assembly are respectively fitted in the first and second passages.

In the above uniform distribution support structure of rotary shaft link assembly, the guide faces and the guide arched faces are raised arched faces, while the opposite guide arched faces and the opposite guide faces are recessed arched faces.

In the above uniform distribution support structure of rotary shaft link assembly, two lateral sides of each connection member are respectively formed with two arched channels corresponding to the opening of the hollow section. The spacer shaft rods are held by the arched channels.

In the above uniform distribution support structure of rotary shaft link assembly, the rotary shaft assembly is disposed between a first support and a second support. The first support is connected with a first article. The second support is connected with a second article. The support member is connected between the first and second supports.

In the above uniform distribution support structure of rotary shaft link assembly, a synchronous rotational assembly passes through the hollow sections of the connection members. The synchronous rotational assembly is forcedly bendable and at least composed of a pivot shaft assembly and a toothed ring assembly. The pivot shaft assembly has multiple pivot shafts side-by-side arranged. The toothed ring assembly has multiple toothed rings partially engaged with each other. The toothed rings are sequentially engaged to connect the respective pivot shafts, whereby the connection members are driven to synchronously pivotally rotate.

In the above uniform distribution support structure of rotary shaft link assembly, the synchronous rotational assembly has a connection seat and a connection component connected with two lateral sides of the toothed ring assembly. The connection seat is secured to the first support (or the second support), while the connection component is securely connected with the second support (or the first support).

Still to achieve the above and other objects, the uniform distribution support structure of rotary shaft link assembly of the present invention includes: a rotary shaft assembly at least having multiple connection members and spacer shaft rods, which are side-by-side arranged, each connection member being formed with at least one perforation, the spacer shaft rods being assembled and disposed between the connection members, each spacer shaft rod being formed with at least one through hole corresponding to the perforation, at least one guide arched face being disposed in each through hole; and a support assembly at least having a support member passing through the respective perforations and through holes, multiple opposite guide arched faces being disposed on the support member corresponding to the guide arched faces, the guide arched faces respectively abutting against the opposite guide arched faces to locate, whereby the spacer shaft rods between the connection members are supported and arranged at fixed intervals to stably and smoothly rotate.

The present invention can be best understood through the following description and accompanying drawings, wherein:

DETAILED DESCRIPTION OF THE PREFERRED EMBODIMENTS

Figure 1:
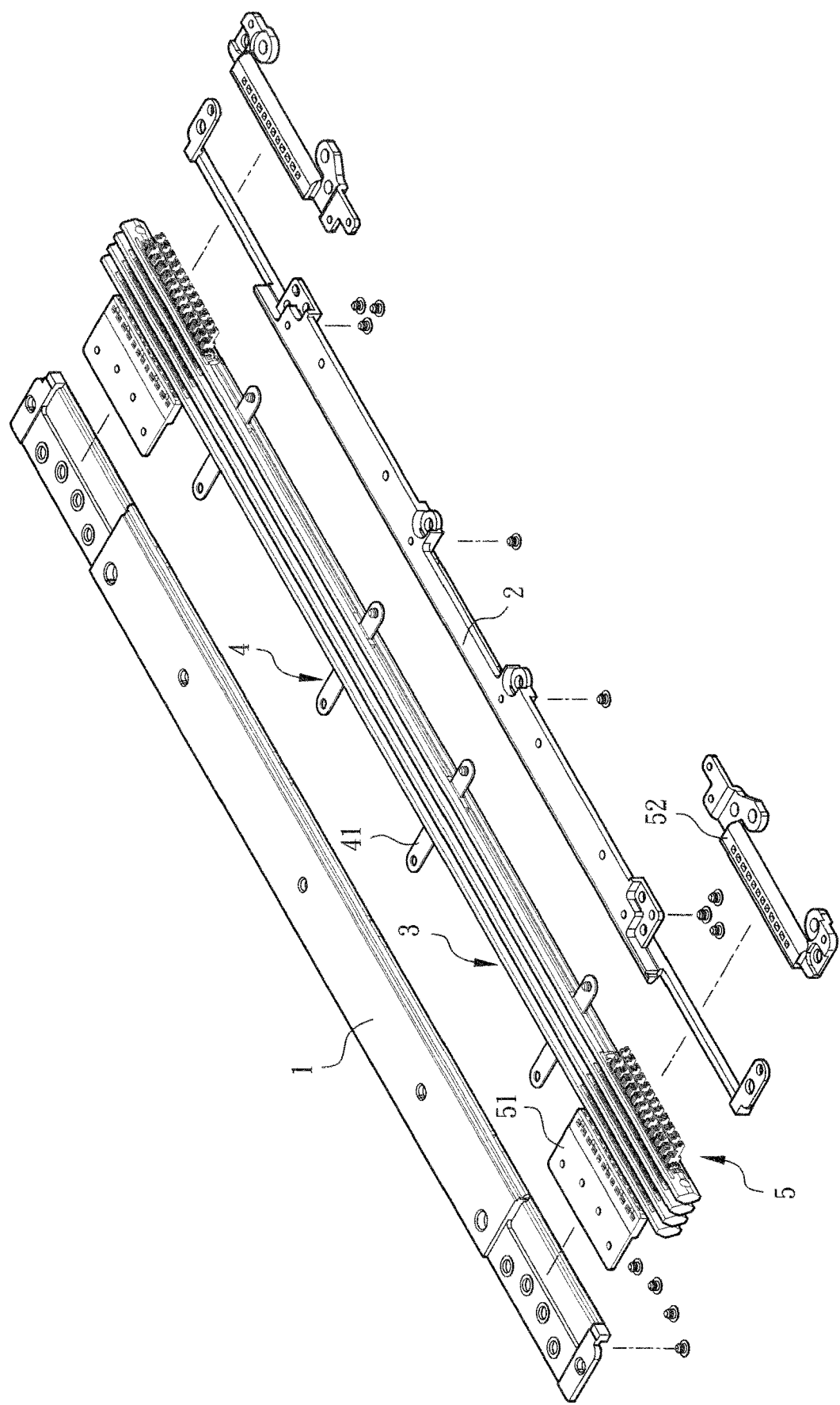
FIG. 1 is a perspective exploded view of the present invention.
Figure 2:
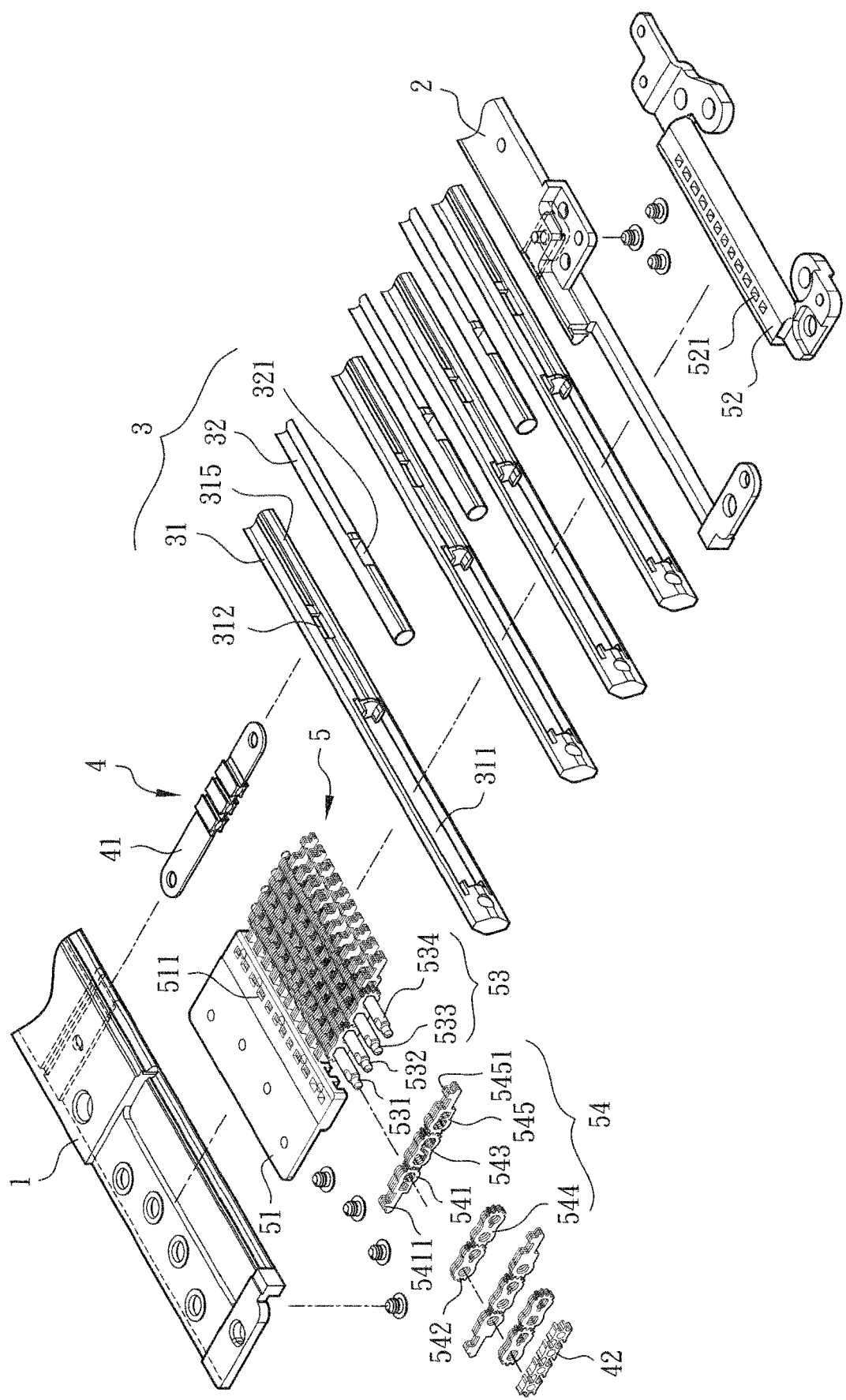
FIG. 2 is a perspective partially exploded view of the present invention.
Figure 3:
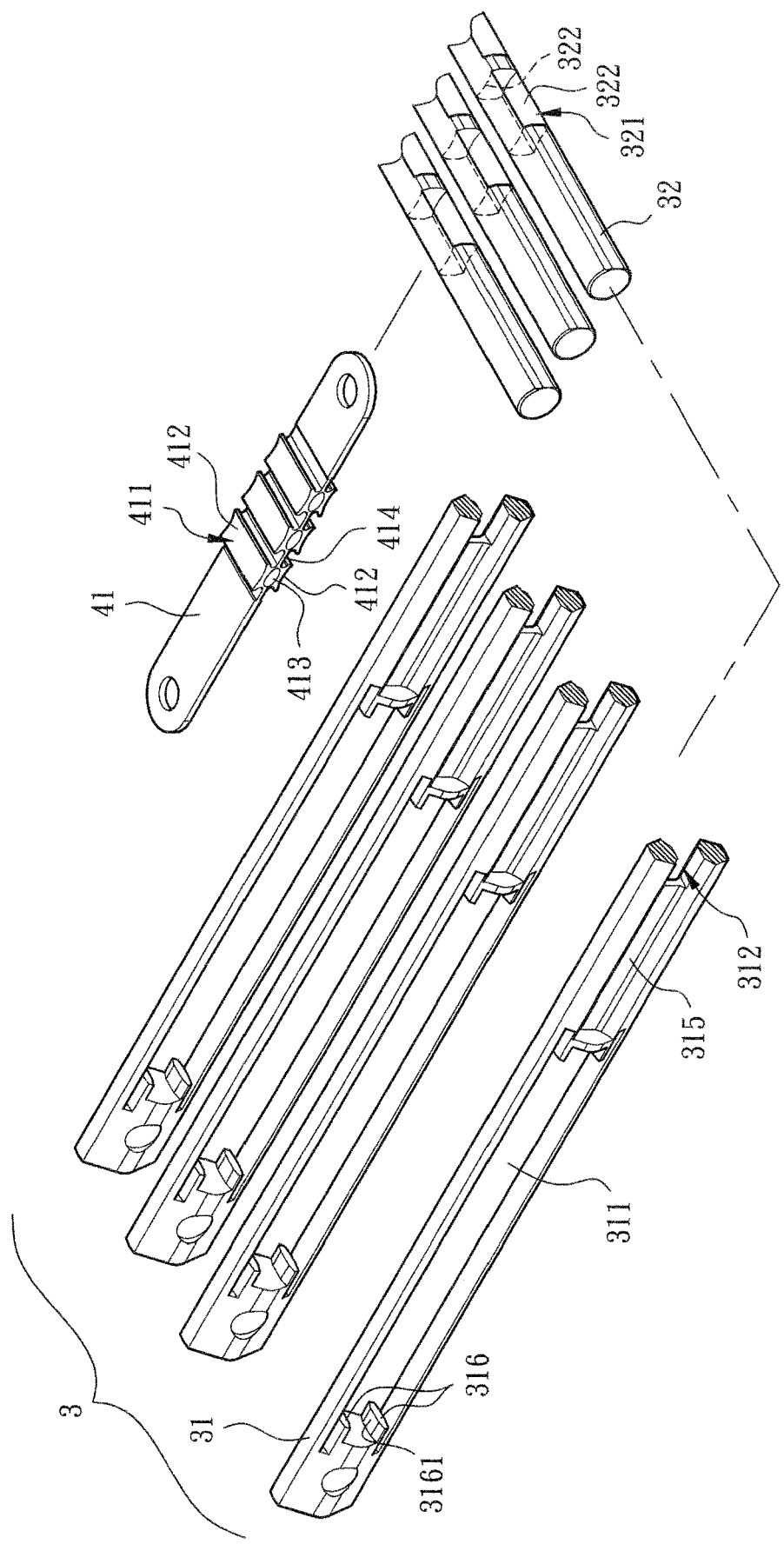
FIG. 3 is a partially enlarged exploded view of the relevant sections of the rotary shaft assembly and the support member of the present invention.
Figure 4:
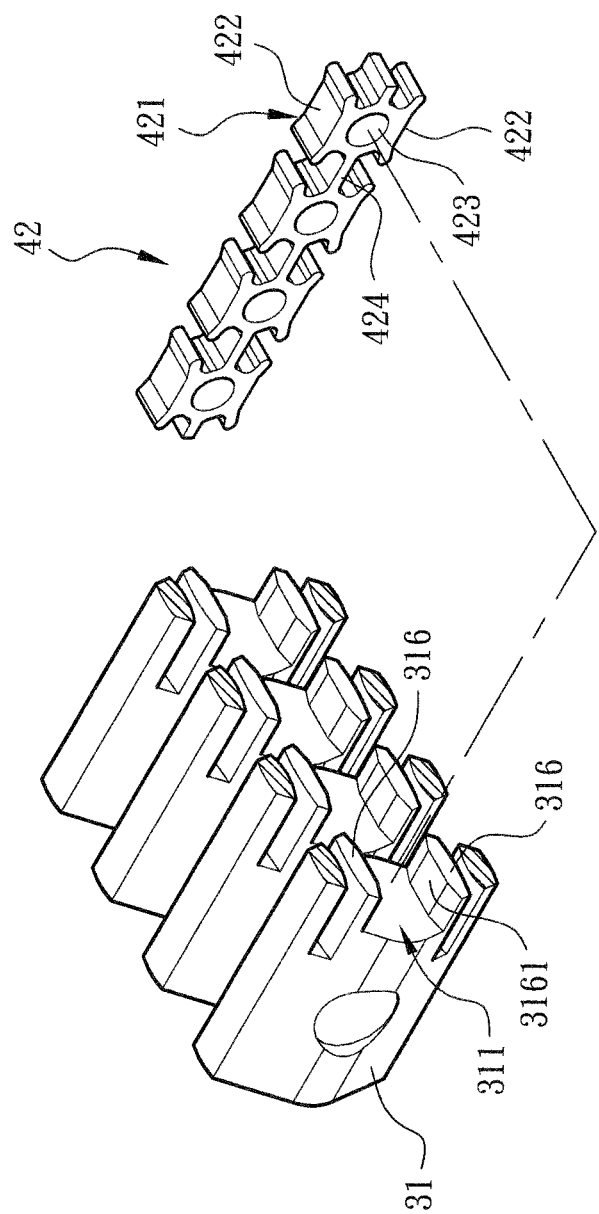
FIG. 4 is a partially enlarged exploded view of the relevant sections of the connection member and the lateral support member of the present invention.
Figure 5:
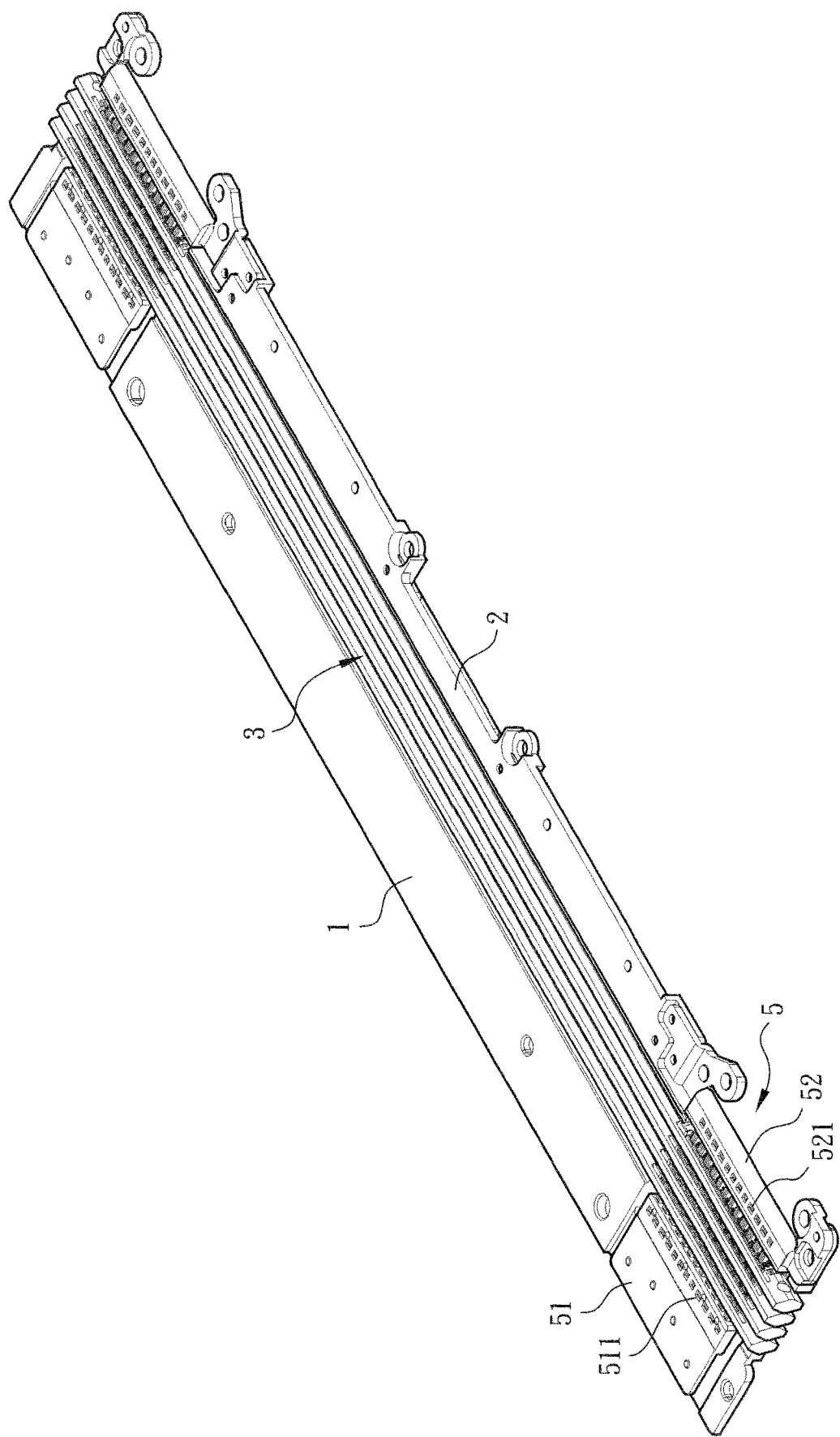
FIG. 5 is a perspective assembled view of the present invention.

Please refer to FIGS. 1 to 5. The present invention includes a first support 1, a second support 2, a rotary shaft assembly 3 and a support assembly 4. The first support 1 is connected with a first article (not shown, can be a section of an electronic device). The second support 2 is connected with a second article (not shown, can be another section of the electronic device).

The rotary shaft assembly 3 is composed of multiple connection members 31 and multiple spacer shaft rods 32. The connection members 31 are side-by-side arranged between the first and second supports 1, 2. Each connection member 31 is correspondingly formed with at least one hollow section 311 and at least one perforation 312. The top section and the bottom section of at least one lateral side in the hollow section 311 are respectively formed with two transversely protruding restriction sections 316. The opposite sides of the two restriction sections 316 are respectively formed with two guide faces 3161, (which can be raised arched faces). Two lateral sides of each connection member 31 are respectively formed with two arched channels 315 corresponding to the opening of the hollow section 311.

The spacer shaft rods 32 are respectively attached to and sandwiched between the connection members 31. Each spacer shaft rod 32 is formed with at least one through hole 321 respectively corresponding to the perforations 312. The top side and the bottom side of each through hole 321 are respectively formed with two guide arched faces 322, (which can be raised arched faces). In a preferred embodiment, the spacer shaft rods 32 are cylindrical bodies. Two lateral sides of the spacer shaft rods 32 are respectively held by the arched channels 315 of the adjacent connection members 31, whereby the connection members 31 and the spacer shaft rods 32 can smoothly rotate and displace relative to each other.

The support assembly 4 includes at least one flexible support member 41 and at least one flexible lateral support member 42. The support member 41 can respectively pass through the through holes 321 of the spacer shaft rods 32 (and the perforations 312 of the connection members 31) to connect with the first and second supports 1, 2. Multiple first seat sections 411 are disposed on the support member 41 respectively corresponding to the spacer shaft rods 32. Each two adjacent first seat sections 411 are serially connected with each other via a flexible first connection section 414. A first passage 413 is transversely formed through the center of each first seat section 411. The top side and bottom side of each first seat section 411 are respectively formed with two opposite guide arched faces 412, (which can be recessed arched faces) to respectively abut against the guide arched faces 322 and locate. In addition, after compressed, the first passage 413 is elastically deformed, whereby the opposite guide arched faces 412 and the guide arched faces 322 are kept elastically fastened.

The lateral support member 42 is passed between the two restriction sections 316 in each hollow section 311. Multiple second seat sections 421 are disposed on the lateral support member 42 respectively corresponding to the connection members 31. Each two adjacent second seat sections 421 are serially connected with each other via a flexible second connection section 424. A second passage 423 is transversely formed through the center of each second seat section 421. The top side and bottom side of each second seat section 421 are respectively formed with two opposite guide faces 422, (which can be recessed arched faces) to respectively abut against the guide faces 3161 and locate.

In a preferred embodiment, a synchronous rotational assembly 5 passes through the hollow sections 311 of the connection members 31. Two sides of the synchronous rotational assembly 5 are respectively connected with the first and second supports 1, 2. The synchronous rotational assembly 5 is composed of a connection seat 51, a connection component 52, a pivot shaft assembly 53 and a toothed ring assembly 54. One side of the connection seat 51 is connected with the first support 1. One side of the connection seat 51 distal from the first support 1 is formed with multiple sockets 511. One side of the connection component 52 is connected with the second support 2. One side of the connection component 52 distal from the second support 2 is formed with multiple sockets 521.

The pivot shaft assembly 53 is composed of a first pivot shaft 531, a second pivot shaft 532, a third pivot shaft 533 and a fourth pivot shaft 534, which are side-by-side arranged between the first and second supports 1, 2. The first, second, third and fourth pivot shafts 531, 532, 533, 534 are respectively inserted into the second passages 423 of the lateral support member 42 and securely connected therein. The toothed ring assembly 54 has a first toothed ring 541, a second toothed ring 542, a third toothed ring 543, a fourth toothed ring 544 and a fifth toothed ring 545, which are partially engaged with each other. The first, third and fifth toothed rings 541, 543, 545 are sequentially engaged with each other. The first toothed ring 541 is securely fitted on the first pivot shaft 531. A raised section 5411 is disposed on one side of the first toothed ring 541, which is securely connected in the socket 511 of the connection seat 51.

The fifth toothed ring 545 is securely fitted on the fourth pivot shaft 534 is fitted. A raised section 5451 is disposed on one side of the fifth toothed ring 545, which is securely connected in the socket 521 of the connection component 52. The third toothed ring 543 is engaged between the first and fifth toothed rings 541, 545. The third toothed ring 543 is respectively securely fitted on the second and third pivot shafts 532, 533. The second and fourth toothed rings 542, 544 are engaged with each other. The second toothed ring 542 is respectively securely fitted on the first and second pivot shafts 531, 532. The fourth toothed ring 544 is respectively securely fitted on the third and fourth pivot shafts 533, 534.

By means of the first, second, third, fourth and fifth toothed rings 541, 542, 543, 544, 545, the first, second, third and fourth pivot shafts 531, 532, 533, 534 are synchronously rotatably connected with each other.

Figure 6:
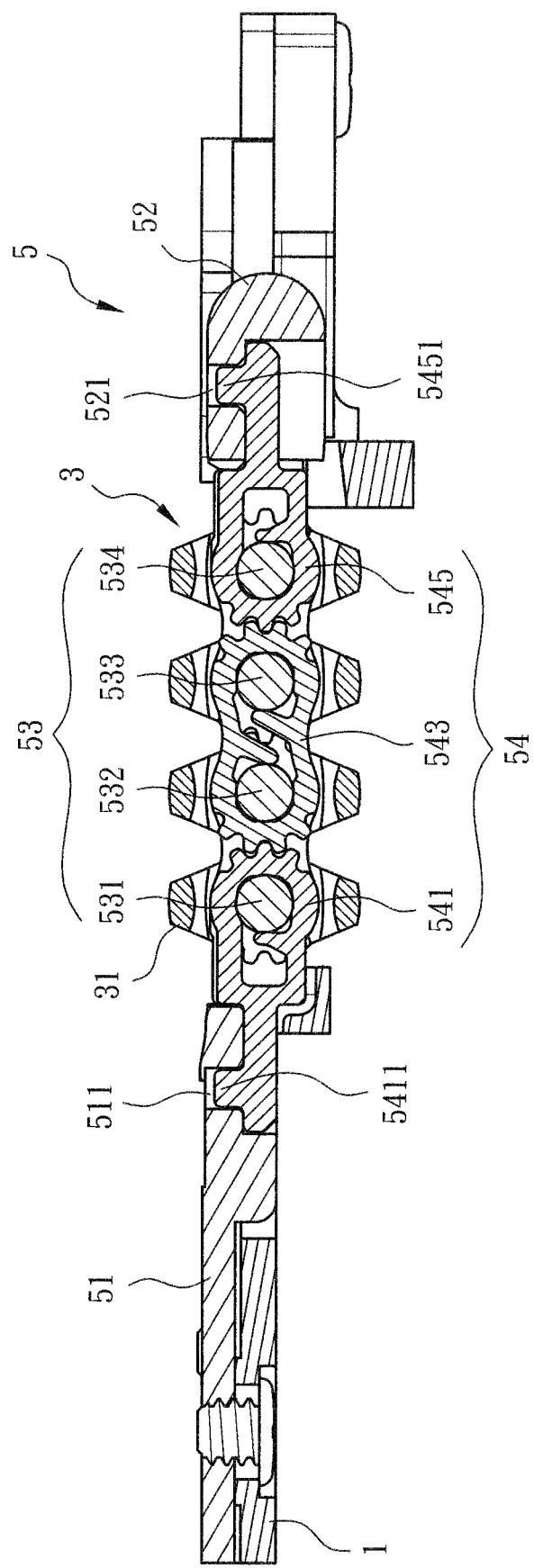
FIG. 6 is a side sectional assembled view of the synchronous rotational assembly of the present invention.
Figure 7:
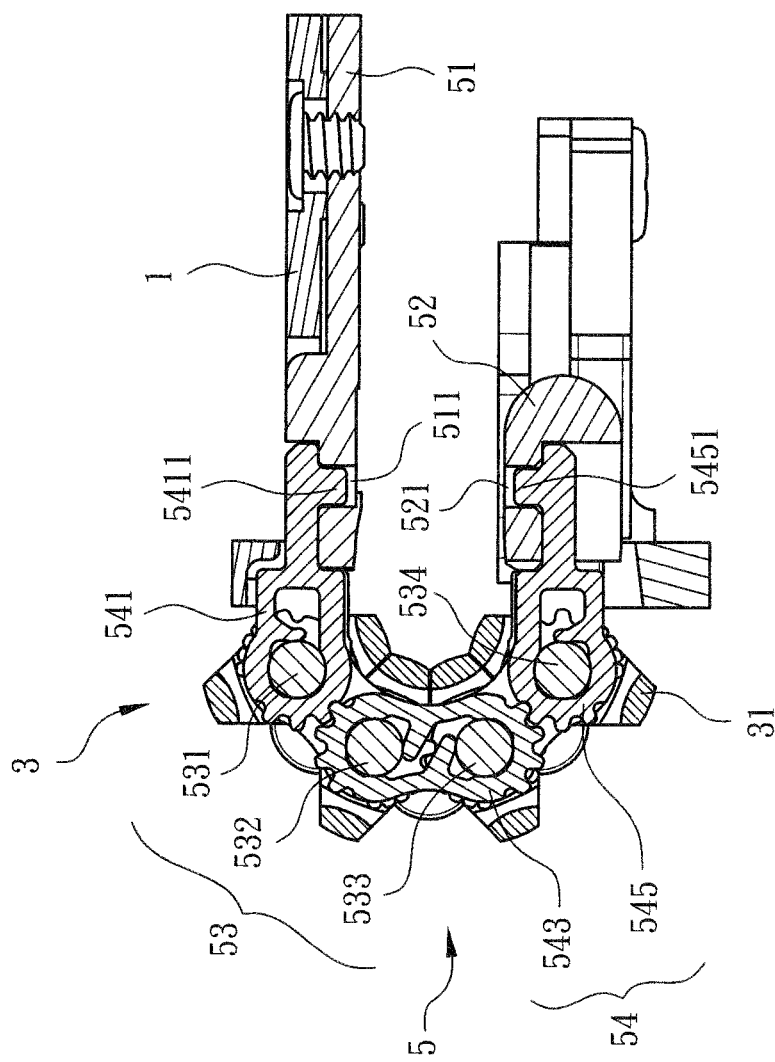
FIG. 7 is a view according to FIG. 6, showing a bent state thereof.
Figure 8:
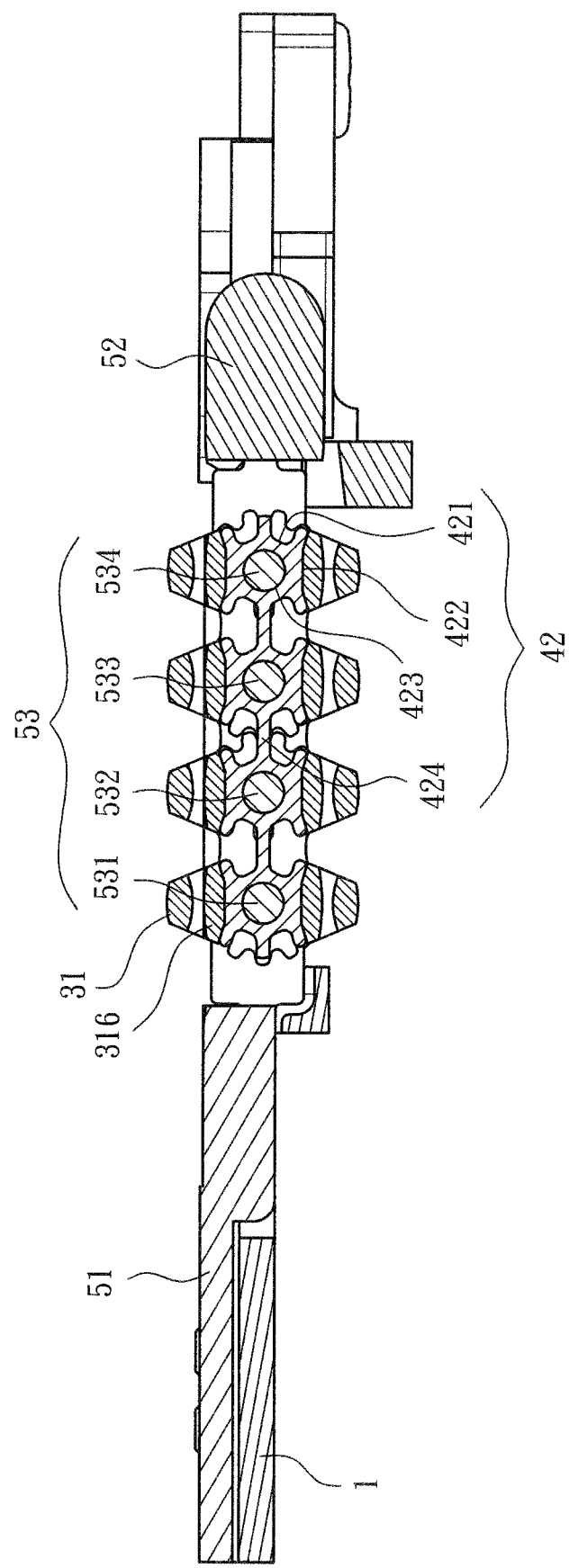
FIG. 8 is a side sectional assembled view of the lateral support member of the present invention.
Figure 9:
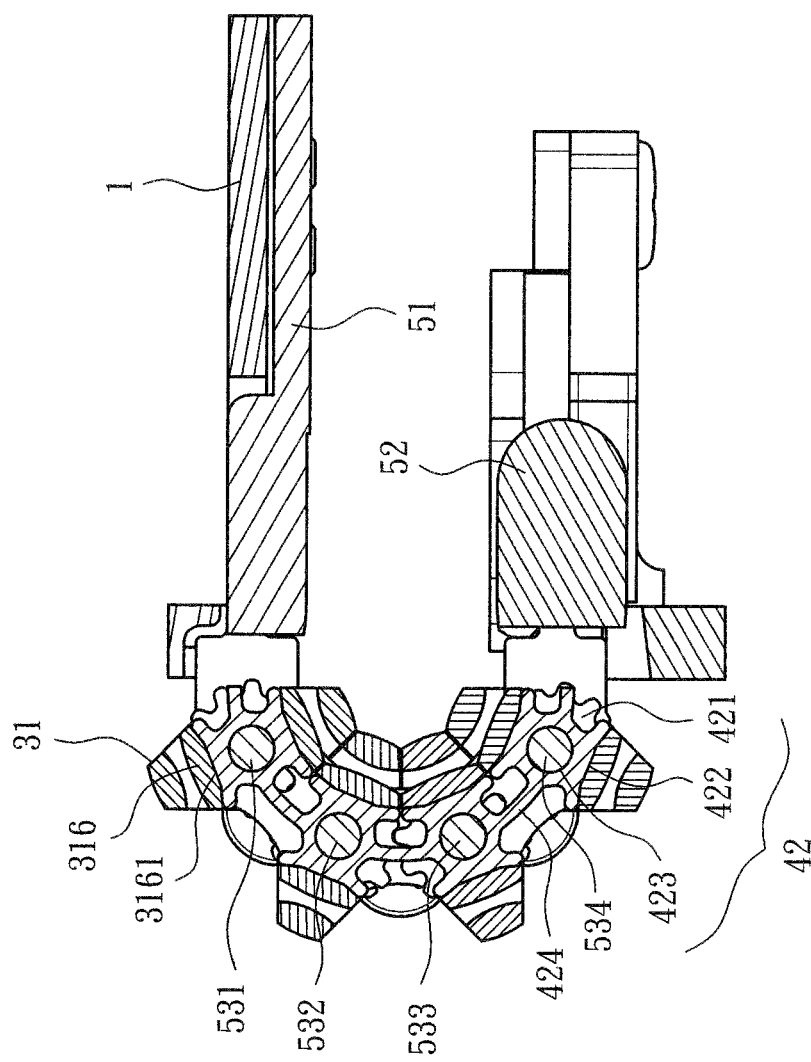
FIG. 9 is a view according to FIG. 8, showing a bent state thereof.
Figure 10:
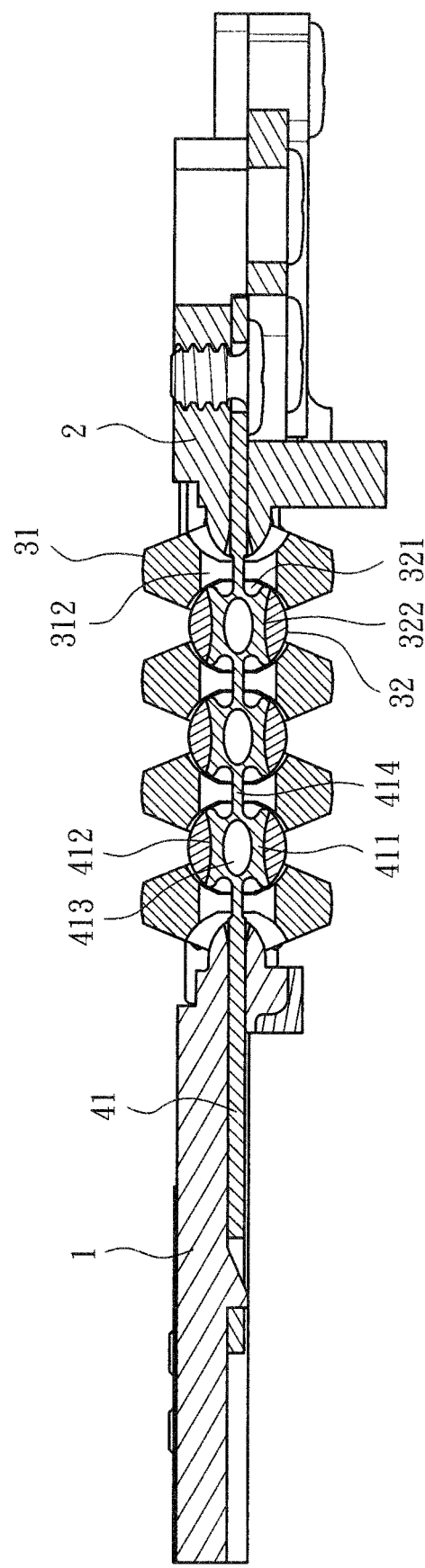
FIG. 10 is a side sectional assembled view of the support member of the present invention.
Figure 11:
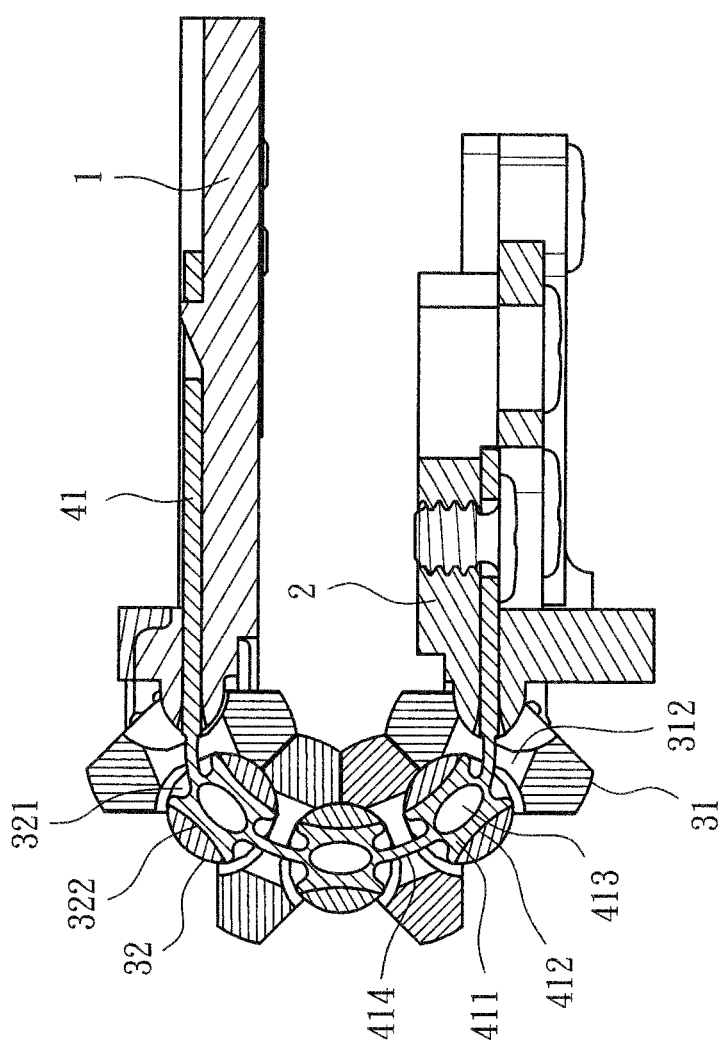
FIG. 11 is a view according to FIG. 10, showing a bent state thereof.

Please refer to FIGS. 6 and 7. In use of the rotary shaft link assembly structure of the present invention, when the first and second supports 1, 2 are respectively forced and rotated, the force is transmitted to the toothed ring assembly 54 via the connection seat 51 and the connection component 52. Accordingly, the first, second, third and fourth pivot shafts 531, 532, 533, 534 of the pivot shaft assembly 53 can be synchronously forward/backward pivotally rotated and displaced via the first, second, third, fourth and fifth toothed rings 541, 542, 543, 544, 545, whereby the first and second articles can be opened/closed relative to each other.

Please refer to FIGS. 8 to 11. When the first and second supports 1, 2 (the first and second articles) are opened/closed relative to each other, the connection members 31 are driven by the synchronous rotational assembly 5 to synchronously rotate. At this time, under the action force of the spacer shaft rods 32 and the connection members 31, the support member 41 and the lateral support member 42 respectively make the first and second connection sections 414, 424 bend and deform, whereby the spacer shaft rods 32 and the connection members 31 can more stably and smoothly pivotally rotate and displace relative to each other.

During the move of the connection members 31, the guide faces 3161 fasten and abut against the opposite guide faces 422, whereby the second seat sections 421 can respectively support the restriction sections 316 (connection members 31). In addition, by means of the second seat sections 421, the connection members 31 are arranged at fixed intervals. Also, when the external force applied to the first and second supports 1, 2 is too great, the guide faces 3161 can slip along the opposite guide faces 422 to absorb the external force and the manufacturing precision error of the connection members 31 and the lateral support member 42 and the relevant components so as to avoid any abnormality causing clogging and disability of pivotal rotation.

During the move of the spacer shaft rods 32, the arched guide faces 322 fasten and abut against the opposite guide arched faces 412, whereby the first seat sections 411 can respectively support the spacer shaft rods 32. In addition, by means of the first seat sections 411, the spacer shaft rods 32 are arranged at fixed intervals. Also, when the external force applied to the first and second supports 1, 2 is too great, the guide arched faces 322 can slip along the opposite guide arched faces 412 to absorb the external force and the manufacturing precision error of the spacer shaft rods 32 and the support member 41 and the relevant components so as to avoid any abnormality causing clogging and disability of pivotal rotation.

In the above structure of the present invention, the connection members 31 and the spacer shaft rods 32 of the rotary shaft assembly 3 are transversely serially connected by means of the support assembly 4. Also, by means of the connection members 31 and the spacer shaft rods 32, the first and second supports 1, 2 (the first and second articles) are arranged at fixed intervals and supported without easy loosening. Accordingly, the first and second supports 1, 2 (the first and second articles) can be stably and smoothly pivotally rotated and displaced.

In conclusion, the uniform distribution support structure of rotary shaft link assembly of the present invention can truly connect the first and second articles and make the first and second articles stably and smoothly pivotally rotate. The uniform distribution support structure of rotary shaft link assembly of the present invention is inventive and advanced.

The above embodiments are only used to illustrate the present invention, not intended to limit the scope thereof. Many modifications of the above embodiments can be made without departing from the spirit of the present invention.

What is claimed is:

1. A uniform distribution support structure of rotary shaft link assembly, comprising:
    a rotary shaft assembly at least having multiple connection members, the connection members being side-by-side arranged, each connection member being formed with at least one hollow section disposed in correspondence one with respect to another, at least one first guide face being disposed in each hollow section, each connection member further being formed with at least one perforation, the rotary shaft assembly having multiple spacer shaft rods respectively disposed between the connection members, each spacer shaft rod being formed with at least one through hole respectively corresponding to the perforations, at least one first guide arched face being disposed in each through hole; and
    a support assembly having at least one flexible lateral support member passing through corresponding ones of hollow sections, the at least one lateral support member having multiple second guide faces disposed in correspondence with respective ones of the first guide faces and in abutting relationship therewith, the support assembly further having a support member, the support member passing through the perforations of the connection members and the through holes of the spacer shaft rods, the support member having multiple second guide arched faces being disposed on the support member in respective correspondence with the first guide arched faces of the spacer shaft rod and in abutting relationship therewith, whereby when the connection members rotate and displace, the connection members are stably supported and arranged at fixed intervals, and the spacer shaft rods are supported and arranged at fixed intervals to stably and smoothly rotate.

2. The uniform distribution support structure of rotary shaft link assembly as claimed in claim 1, wherein multiple outward protruding second seat sections are disposed on the lateral support member, a flexible second connection section being disposed between each two adjacent second seat sections, the second guide faces being respectively disposed on the second seat sections, multiple outward protruding first seat sections being disposed on the support member, a flexible first connection section being disposed between each two adjacent first seat sections, the second guide arched faces being respectively disposed on the first seat sections.

3. The uniform distribution support structure of rotary shaft link assembly as claimed in claim 2, wherein a first passage is transversely formed through each first seat section and a second passage is transversely formed through each second seat section, the pivot shafts of the pivot shaft assembly being respectively fitted in the first and second passages.

4. The uniform distribution support structure of rotary shaft link assembly as claimed in claim 3, wherein two lateral sides of each connection member are respectively formed with two arched channels corresponding to an opening formed in the hollow section, the spacer shaft rods being held by the arched channels.

5. The uniform distribution support structure of rotary shaft link assembly as claimed in claim 3, wherein a synchronous rotational assembly passes through the hollow sections of the connection members, the synchronous rotational assembly being forcedly bendable and at least composed of a pivot shaft assembly and a toothed ring assembly, the pivot shaft assembly having multiple pivot shafts side-by-side arranged, the toothed ring assembly having multiple toothed rings partially engaged with each other, the toothed rings being sequentially engaged to connect the respective pivot shafts, whereby the connection members are driven to synchronously pivotally rotate.

6. The uniform distribution support structure of rotary shaft link assembly as claimed in claim 2, wherein two lateral sides of each connection member are respectively formed with two arched channels corresponding to an opening formed in the hollow section, the spacer shaft rods being held by the arched channels.

7. The uniform distribution support structure of rotary shaft link assembly as claimed in claim 2, wherein a synchronous rotational assembly passes through the hollow sections of the connection members, the synchronous rotational assembly being forcedly bendable and at least composed of a pivot shaft assembly and a toothed ring assembly, the pivot shaft assembly having multiple pivot shafts side-by-side arranged, the toothed ring assembly having multiple toothed rings partially engaged with each other, the toothed rings being sequentially engaged to connect the respective pivot shafts, whereby the connection members are driven to synchronously pivotally rotate.

8. The uniform distribution support structure of rotary shaft link assembly as claimed in claim 1, wherein the first guide faces and the first guide arched faces are raised arched faces, while the corresponding second guide arched faces and the corresponding second guide faces are recessed arched faces.

9. The uniform distribution support structure of rotary shaft link assembly as claimed in claim 8, wherein two lateral sides of each connection member are respectively formed with two arched channels corresponding to an opening formed in the hollow section, the spacer shaft rods being held by the arched channels.

10. The uniform distribution support structure of rotary shaft link assembly as claimed in claim 8, wherein a synchronous rotational assembly passes through the hollow sections of the connection members, the synchronous rotational assembly being forcedly bendable and at least composed of a pivot shaft assembly and a toothed ring assembly, the pivot shaft assembly having multiple pivot shafts side-by-side arranged, the toothed ring assembly having multiple toothed rings partially engaged with each other, the toothed rings being sequentially engaged to connect the respective pivot shafts, whereby the connection members are driven to synchronously pivotally rotate.

11. The uniform distribution support structure of rotary shaft link assembly as claimed in claim 1, wherein two lateral sides of each connection member are respectively formed with two arched channels corresponding to an opening formed in the hollow section, the spacer shaft rods being held by the arched channels.

12. The uniform distribution support structure of rotary shaft link assembly as claimed in claim 11, wherein a synchronous rotational assembly passes through the hollow sections of the connection members, the synchronous rotational assembly being forcedly bendable and at least composed of a pivot shaft assembly and a toothed ring assembly, the pivot shaft assembly having multiple pivot shafts side-by-side arranged, the toothed ring assembly having multiple toothed rings partially engaged with each other, the toothed rings being sequentially engaged to connect the respective pivot shafts, whereby the connection members are driven to synchronously pivotally rotate.

13. The uniform distribution support structure of rotary shaft link assembly as claimed in claim 1, wherein the rotary shaft assembly is disposed between a first support and a second support, the first support being connected with a first article, the second support being connected with a second article, the lateral support member being connected between the first and second supports.

14. The uniform distribution support structure of rotary shaft link assembly as claimed in claim 1, wherein a synchronous rotational assembly passes through the hollow sections of the connection members, the synchronous rotational assembly being forcedly bendable and at least composed of a pivot shaft assembly and a toothed ring assembly, the pivot shaft assembly having multiple pivot shafts side-by-side arranged, the toothed ring assembly having multiple toothed rings partially engaged with each other, the toothed rings being sequentially engaged to connect the respective pivot shafts, whereby the connection members are driven to synchronously pivotally rotate.

15. A uniform distribution support structure of rotary shaft link assembly, comprising:
   a rotary shaft assembly at least having multiple connection members, the connection members being side-by-side arranged, each connection member being formed with at least one hollow section disposed in correspondence one with respect to another, at least one first guide face being disposed in each hollow section;
   a synchronous rotational assembly passing through the hollow sections of the connection members, the synchronous rotational assembly being forcedly bendable and at least composed of a pivot shaft assembly and a toothed ring assembly, the pivot shaft assembly having multiple pivot shafts arranged in side-by-side relationship, the toothed ring assembly having multiple toothed rings partially engaged with each other, the toothed rings being sequentially engaged to connect the respective pivot shafts, whereby the connection members are driven to synchronously pivotally rotate; and
   a support assembly having at least one flexible lateral support member passing through corresponding ones of hollow sections, the at least one lateral support member having multiple second guide faces disposed in correspondence with respective ones of the first guide faces and in abutting relationship therewith, whereby when the connection members rotate and displace, the connection members are stably supported and arranged at fixed intervals.

16. A uniform distribution support structure of rotary shaft link assembly, comprising:
   a rotary shaft assembly at least having multiple connection members and spacer shaft rods arranged in side-by-side relationship, each connection member being formed with at least one perforation, the spacer shaft rods being assembled and disposed between the connection members, each spacer shaft rod being formed with at least one through hole disposed in correspondence to the perforation of adjacent connection members, at least one first guide arched face being disposed in each through hole; and
   a support assembly having at least one support member passing through the corresponding perforations and through holes, the support member having multiple second guide arched faces disposed thereon and in respective correspondence with the first guide arched faces and in abutting relationship therewith, whereby the spacer shaft rods between the connection members are supported and arranged at fixed intervals to stably and smoothly rotate.

17. The uniform distribution support structure of rotary shaft link assembly as claimed in claim 16, wherein multiple outward protruding first seat sections are disposed on the support member, a flexible first connection section being disposed between each two adjacent first seat sections, the second guide arched faces being respectively disposed on the first seat sections.

18. The uniform distribution support structure of rotary shaft link assembly as claimed in claim 17, wherein a first passage is transversely formed through each first seat section.

19. The uniform distribution support structure of rotary shaft link assembly as claimed in claim 16, wherein two lateral sides of each connection member are respectively formed with two arched channels corresponding to an opening formed in the hollow section, the spacer shaft rods being held by the arched channels.

* * * * *